United States Patent [19]

Inada

[11] Patent Number: 5,044,576
[45] Date of Patent: Sep. 3, 1991

[54] PARAWING WITH AN AUTOMATIC CANOPY WITHDRAWING MECHANISM

[76] Inventor: Taichi Inada, 10F-5, No. 417, Kwang Fu S. Rd., Taipei, Taiwan, Taiwan

[21] Appl. No.: 571,873

[22] Filed: Aug. 24, 1990

[51] Int. Cl.$^5$ .............................................. B64D 17/02
[52] U.S. Cl. .................................... 244/13; 244/145; 244/146; 244/152; 244/154; 244/902; 244/903
[58] Field of Search ............... 244/13, 154, 155 R, 244/155 A, 902, 903, 145–147, 152, 113

[56] References Cited

U.S. PATENT DOCUMENTS

| | | | |
|---|---|---|---|
| 2,610,008 | 9/1952 | Smith | 244/152 |
| 4,399,969 | 8/1983 | Gargano | 244/902 |
| 4,601,443 | 7/1986 | Jones et al. | 244/13 |
| 4,901,945 | 2/1990 | Hodgson | 244/902 |
| 4,930,724 | 6/1990 | Snyder | 244/902 |

Primary Examiner—Joseph F. Peters, Jr.
Assistant Examiner—Linda L. Palomar

[57] ABSTRACT

Disclosed is a parawing with an automatic canopy withdrawing mechanism having a canopy, a frame to which the canopy is fastened and on which a pilot can be carried, a propeller mounted on the frame, and a plurality rows of suspension lines interconnecting the canopy and the frame. Also mounted on the frame is an automatic canopy withdrawing mechanism including a reel which may be operated to pull back the suspension lines for withdrawing the canopy. Further, a front pulling rope interconnecting the reel and two rows of suspension lines near the leading edge of the canopy, a rear pulling rope interconnecting the reel and the trailing edge of the canopy, and a plurality of guide rollers for guiding the movement of the front pulling rope and the rear pulling rope are provided so that the suspension lines and the canopy may be withdrawn by the automatic canopy withdrawing mechanism. With the canopy and the suspension lines being withdrawn. The parawing can be easily steered on the ground free from the possibility of being acted by strong side wind on its canopy. Besides, due to the provision of a rudder at the tail end of the frame, the moving direction of the parawing can be automatically corrected into a direction against the wind when the parawing is acted by a side wind upon take-off so as to avoid the possibility of being upset by the wind. In addition, the provision of the horizontal stabilizer on the frame makes it possible to avoid the pendulum-like motion of the cart and the pilot when the propeller is being accelerated or decelerated during flying. The wheels of the parawing can be replaced by at least one float so that, with the canopy being withdrawn, the parawing can be safely landed on the water surface.

5 Claims, 9 Drawing Sheets

PARAWING WITH AN AUTOMATIC CANOPY WITHDRAWING MECHANISM

BACKGROUND OF THE INVENTION

The present invention relates generally to a parawing with an automatic canopy withdrawing mechanism.

Schematically shown in FIG. 7 is a common paraplane comprising a canopy C and a cart S carrying a propeller (not shown). The canopy C and the propeller, respectively, are adapted to produce lift and thrust required for the flight of the paraplane. Due to lack of an automatic canopy withdrawing device, the canopy cannot be withdrawn automatically even when not in use. Consequently, such a paraplane is difficult to steer on the ground when there is a drag acting on the canopy by the wind. Particularly, as shown in FIG. 8, a side wind W acting on the canopy C may sometimes produce a strong side force tending to upset the paraplane. Besides, since the canopy C cannot be automatically withdrawn when the paraplane is landing, the paraplane may be landed only on the ground. If the pilot attempts to land the paraplane on the water, the canopy will get wet very soon upon landing. In addition, as shown in FIG. 9, the weight (the pilot P and the cart S) suspended below the canopy C tends to swing back and forth like a pendulum in the direction of arrows R and F when the propeller is being accelerated or decelerated during flying because no horizontal stabilizer is provided in the paraplane.

SUMMARY OF THE INVENTION

In view of the above drawbacks of the conventional paraplanes, the primary object of the present invention is to provide a parawing of which the canopy can be withdrawn automatically as desired.

Another object of the present invention is to provide a parawing which can be landed on the water surface.

Another object of the present invention is to provide a parawing which can be steered easily on the ground.

Another object of the present invention is to provide a parawing which, when acted by a side wind upon take-off, can be automatically changed in its moving direction into a direction against the wind so as to avoid the possibility of being upset by the wind.

Yet another object of the present invention is to provide a parawing of which the afore-mentioned pendulum-like motion of the cart and the pilot can be avoided when the propeller is being accelerated or decelerated.

In accordance with the present invention, a parawing comprising:

a canopy adapted to produce a lift required for the parawing;

a frame to which the canopy is fastened and on which a pilot can be carried, the frame including horizontal stabilizing means;

a propeller mounted on the frame adapted to produce a thrust required for propulsion of the parawing;

a rudder pivotably mounted to the rear part of the frame;

a first row of suspension lines including a first group and a second group of suspension lines, the first group of suspension lines being separately fixed at their upper ends to the left side of the canopy near the leading edge, and being fixed at their lower ends to a first fastening point on the frame; the second group of suspension lines being separately fixed at their upper ends to the right side of the canopy near the leading edge, and being fixed at their lower ends to a second fastening point on the frame;

a second row of suspension lines including a third group and a fourth group of suspension lines, the third group of suspension lines being separately fixed at their upper ends to the left side of the canopy intermediate of the leading edge and the trailing edge of the canopy, and being fixed at their lower ends to the first fastening point on the frame; the fourth group of suspension lines being separately fixed at their upper ends to the right side of the canopy intermediate of the leading edge and trailing edge, and being fixed at their lower ends to the second fastening point on the frame;

a third row of suspension lines including a fifth group and a sixth group of suspension lines, the fifth group of suspension lines being separately fixed at their upper ends to the left side of the canopy intermediate of the first group and the second group of suspension lines, and being fixed at their lower ends to a third fastening point on the frame; the sixth group of suspension lines being separately fixed at their upper ends to the right side of the canopy intermediate of the first group and the second group of suspension lines, and being fixed at their lower ends to a fourth fastening point on the frame;

a fourth row of suspension lines including a seventh group and a eighth group of suspension lines, the seventh group of suspension lines being separately fixed at their upper ends to the left side of the canopy intermediate of the third group of suspension lines and the trailing edge, and being fixed at their lower ends to the third fastening point on the frame; the eighth group of suspension lines being separately fixed at their upper ends to the right side of the canopy intermediate of the fourth group of suspension lines and the trailing edge, and being fixed at their lower ends to the fourth fastening point on the frame;

a row of steering lines including a left group and a right group of steering lines, the left group of steering lines being separately fixed at their upper ends to the left side of the trailing edge of the canopy and being fixed at their lower ends to the third fastening point on the frame; the right group of steering lines being separately fixed at their upper ends to the right side of the trailing edge of the canopy, and being fixed at their lower ends to the fourth fastening point on the frame;

a front group of guide rollers provided at proper locations in the frame;

a rear group of guide rollers provided at proper locations in the frame;

an automatic canopy withdrawing mechanism mounted on the frame, including a reel which may be rotated to pull back the suspension lines for withdrawing the canopy;

a front pulling rope which is fixed to the reel at one end, extends forward through the front group of guide rollers, and is then properly connected to all suspension lines included in the first, second, fifth and sixth groups of suspension lines in a manner capable of gathering and pulling the first, second, fifth and sixth groups of suspension lines into a withdrawn state from the front end of the frame under the pulling action of the reel and through the guidance of the front group of guide rollers;

a rear pulling rope which is fixed at one end to the reel, extends rearward through the rear group of guide rollers, and is then connected to the trailing edge of the canopy in a manner capable of gathering and pulling the canopy into a withdrawn state from the rear end of the frame under the pulling action of the reel and through the guidance of the rear group of guide rollers.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
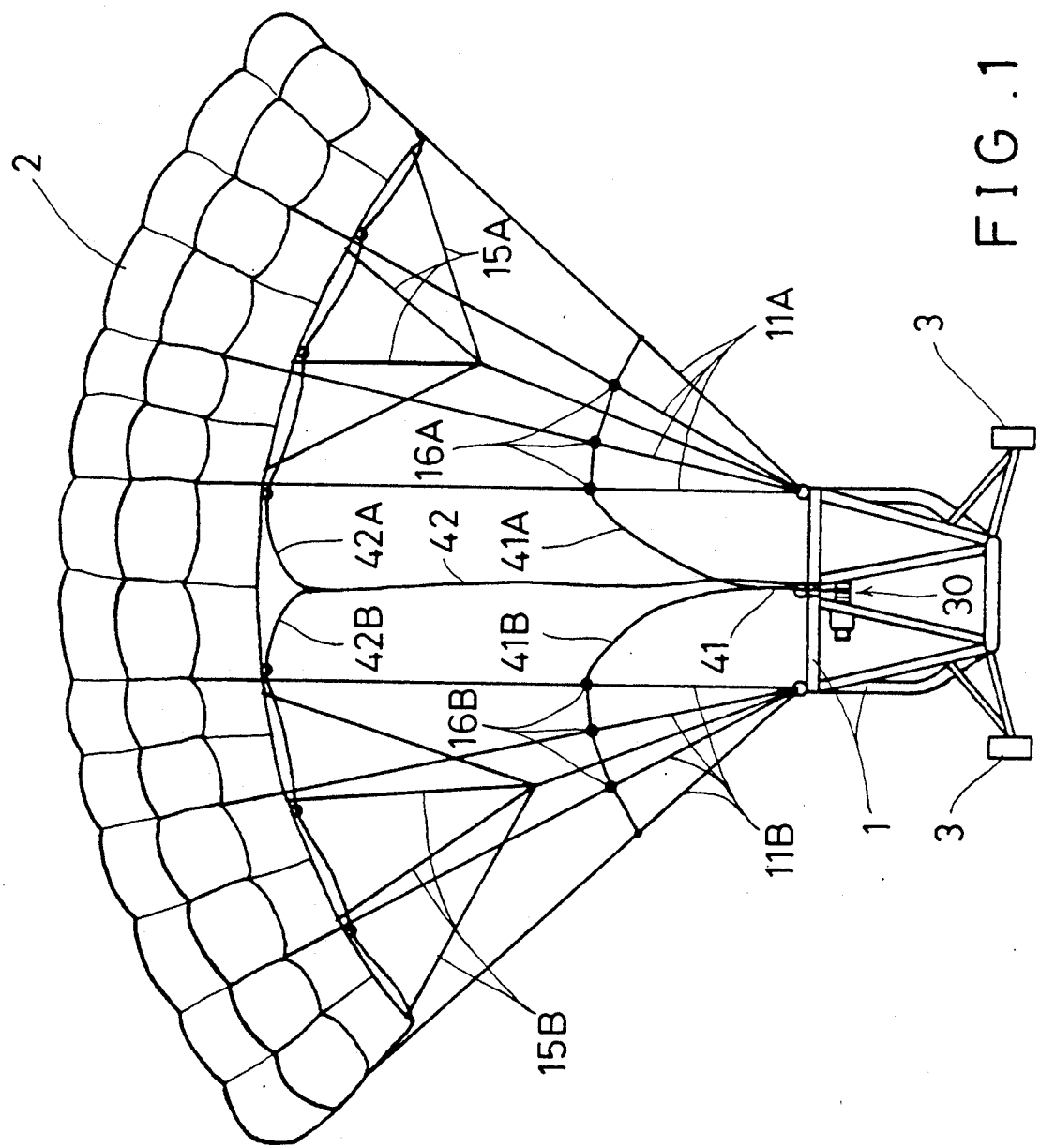
FIG. 1 is a front view of a parawing in accordance with the present invention.
Figure 2:
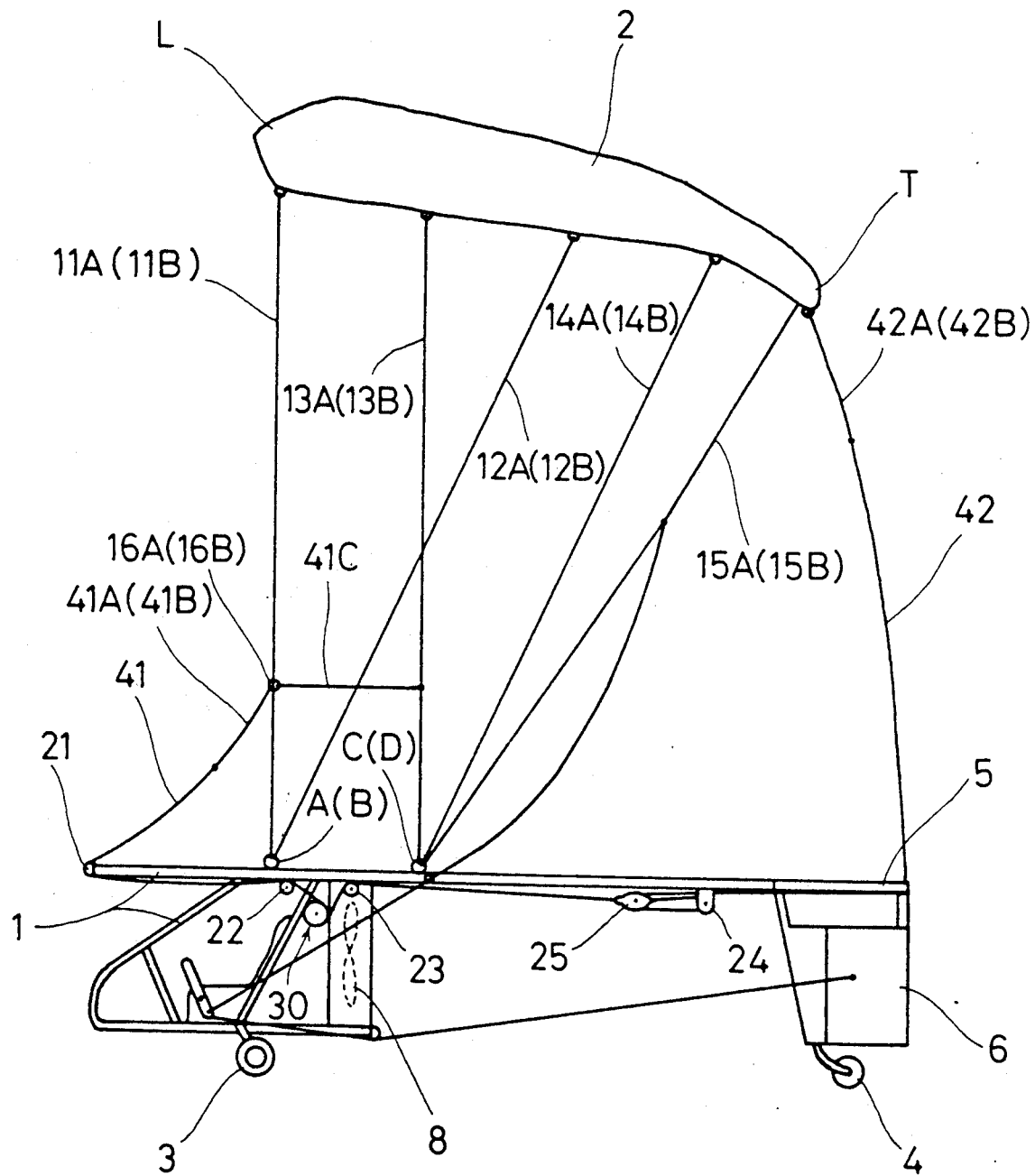
FIG. 2 is a side view of the parawing shown in FIG. 1, in which the canopy is illustrated in an extended state.
Figure 4:
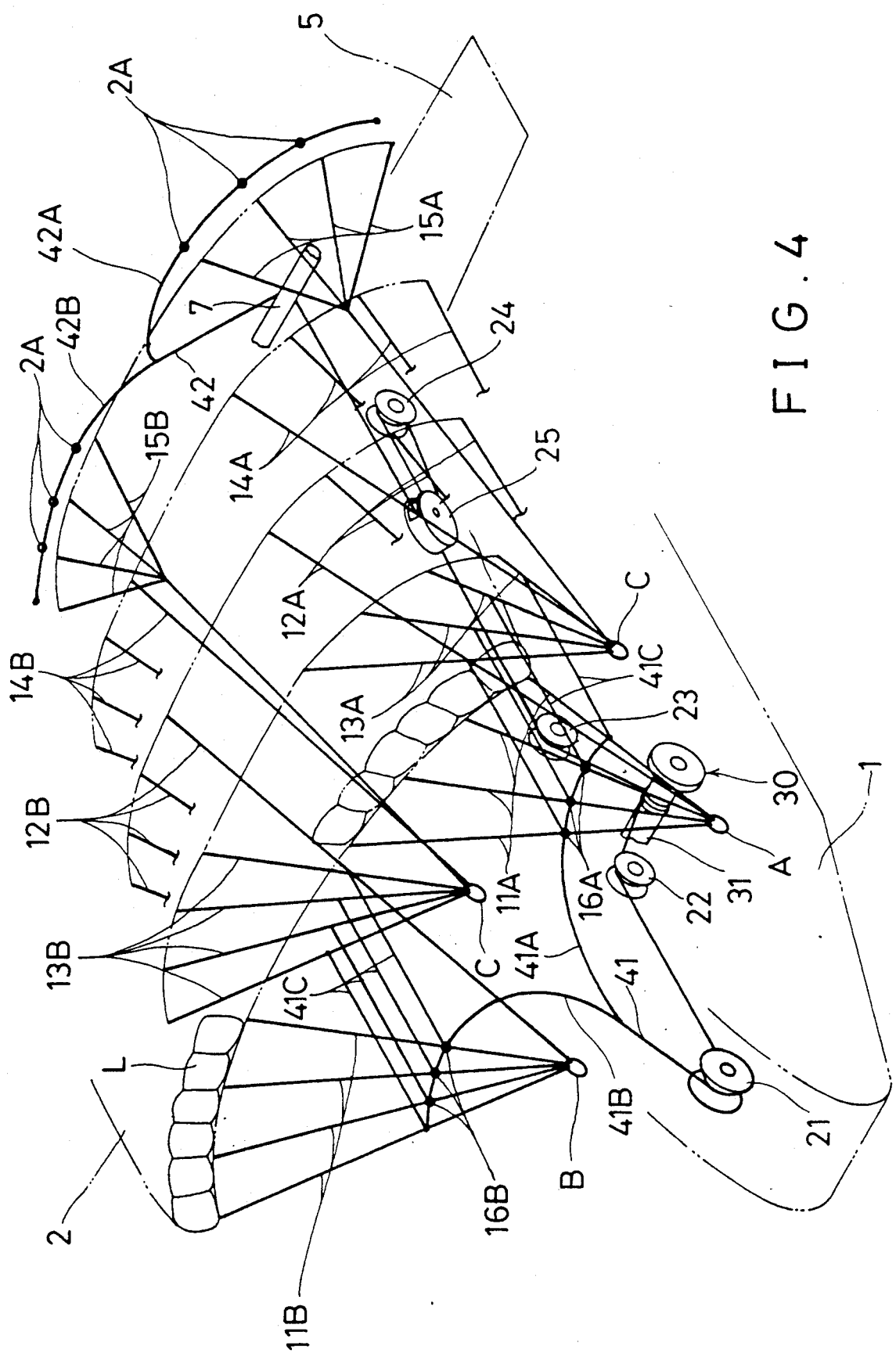
FIG. 4 is a schematic perspective view of the parawing shown in FIGS. 1 through 3, wherein only part of the frame, canopy, and suspension lines of the parawing are illustrated.

As can be seen from FIGS. 1, 2 and 4, a parawing in accordance with a preferred embodiment of the present invention mainly comprises a frame 1, a canopy 2, a propeller 8, four rows of suspension lines 11A (11B) through 14A (14B), a row of steering lines 15A and 15B, a plurality of guide rollers 21, 22 and 23, a fixed pulley 24, a movable pulley 25, an automatic canopy withdrawing mechanism 30, a front pulling rope 41 and a rear pulling rope 42.

The canopy 2 is adapted to produce a lift required for upwardly supporting the parawing, and has a leading edge L and a trailing edge T (see FIG. 2). A plurality of loops 2A (F.g. 4) are provided in the vicinity of the trailing edge of the canopy 2.

The frame 1 is suspended below the canopy 2 by means of the suspension lines 11A (11B) through 14A (14B). It includes two main wheels 3, a tail wheel 4, a pair of horizontal stabilizers 5 (see FIG. 6), and a guide pole 7 interconnecting the pair of horizontal stabilizers 5. A rudder 6 is pivoted to the tail portion of the frame 1, and can be turned within a predetermined angular range around a vertical axis (not shown).

The propeller 8 is mounted on the frame 1 for producing a thrust required for propulsion of the parawing.

As shown in FIGS. 2 and 4, the suspension lines can be divided into four rows which are referred to, respectively, as the first row, the second row, the third row and the fourth row in the direction from the leading edge to the trailing edge of the canopy.

As shown in FIG. 4, the first row of suspension lines includes a first group of suspension lines 11A and a second group of suspension lines 11B. The first group of suspension lines 11A are separately fixed at their upper ends to the left side of the canopy 2 near the leading edge L (also refer to FIG. 2), and are fixed at their lower ends to a first fastening point A on the frame 1. The second group of suspension lines 11B are separately fixed at their upper ends to the right side of the canopy 2 near the leading edge L, and are fixed at their lower ends to a second fastening point B on the frame 1. A loop 16 is attached to each of the first row of suspension lines 11A and 11B except the most lateral two suspension lines for a purpose to be described latter.

The second row of suspension lines includes a third group of suspension lines 12A and a fourth group of suspension lines 12B. The third group of suspension lines 12A are separately fixed at their upper ends to the left side of the canopy 2 intermediate of the leading edge L and the trailing edge T, and are fixed at their lower ends to the first fastening point A on the frame 1. The fourth group of suspension lines 12B are separately fixed at their upper ends to the right side of the canopy 2 intermediate of the leading edge L and the trailing edge T, and are fixed at their lower ends to the second fastening point B on the frame 1.

The third row of suspension lines includes a fifth group of suspension lines 13A and a sixth group of suspension lines 13B. The fifth group of suspension lines 13A are separately fixed at their upper ends to the left side of the canopy 2 intermediate of the first group of suspension lines 11A and the third group of suspension lines 12A, and are fixed at their lower ends to the third fastening point C on the frame 1. The sixth group of suspension lines 13B are separately fixed at their upper ends to the right side of the canopy 2 intermediate of the second group of suspension lines 11B and the fourth group of suspension lines 12B, and are fixed at their lower ends to the fourth fastening point D on the frame 1.

The fourth row of suspension lines includes a seventh group of suspension lines 14A and a eighth group of suspension lines 14B. The seventh group of suspension lines 14A are separately fixed at their upper ends to the left side of the canopy 2 intermediate of the third group of suspension lines 12A and the trailing edge T, and are fixed at their lower ends to the third fastening point C on the frame 1. The eighth group 14b of suspension lines are separately fixed at their upper ends to the right side of the canopy 2 intermediate of the fourth group of suspension lines 12B and the trailing edge T, and are fixed at their lower ends to the fourth fastening point D on the frame 1.

The row of steering lines including a left group and a right group of steering lines 15A and 15B. The left group of steering lines 15A are separately fixed at their upper ends to the left side of the trailing edge T of the canopy 2 and are fixed at their lower ends to the third fastening point C on the frame 1. The right group of steering lines 15B are separately fixed at their upper ends to the right side of the trailing edge T of the canopy 2, and are fixed at their lower ends to the fourth fastening point D on the frame 1.

The guide rollers 21, 22 and 23 are provided at proper locations in the frame 1.

Figure 5:
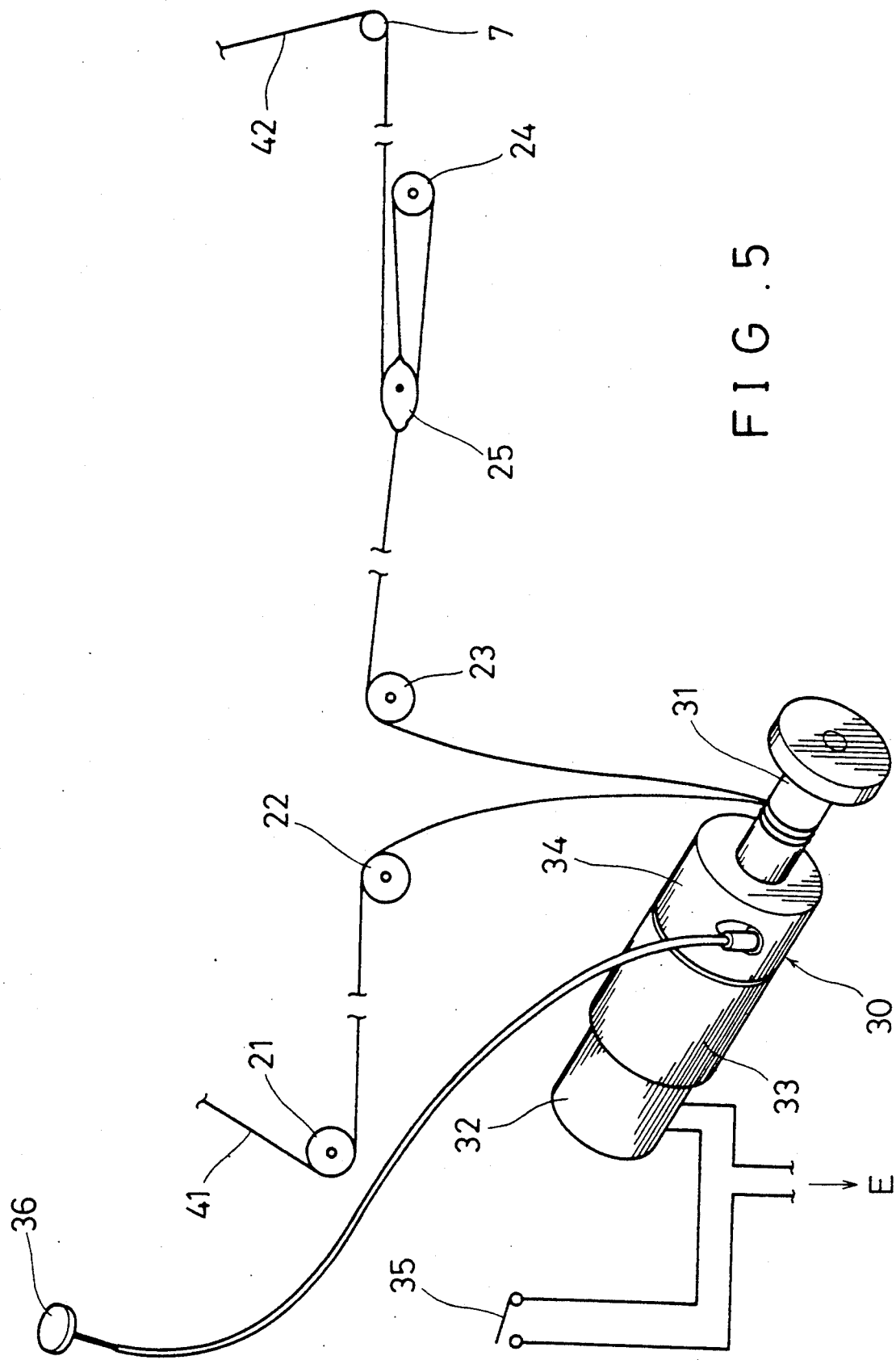
FIG. 5 is a schematic view showing the automatic canopy withdrawing mechanism, guide rollers, fixed pulley and movable pulley of the parawing in accordance with the present invention.

As shown in FIGS. 5 and 4, the automatic canopy withdrawing mechanism 30 mounted on the frame 1 comprises a reel 31 which may be rotated to wind part of the front pulling rope 41 and the rear pulling rope 42 therearound so as to pull back the suspension lines for withdrawing the canopy 2, a motor 32 operable to rotate the reel 31, a clutch and speed reducer assembly 33 interconnecting the motor 32 and the reel 31, and a stopping means 34 for optionally locking or releasing the reel 31. The pilot (not shown) may operate a controlling means 36 to control the stopping means 34 so as to optionally lock the reel 31 from unintentional turning or to release the reel 31 for free turning during winding operation. Besides, the pilot may control the power-on and power-off of the motor 32 through a switch 35. The motor 32 may obtain its electric power from the engine (not shown) for driving the motor 32 as schematically shown in FIG. 5 by the arrow E.

Referring now to FIG. 4, the front pulling rope 41 is fixed at one end to the reel 31, extends forward through the guide rollers 22 and 21, and then branches into two strands 41A and 41B. The strand 41A is guided through the loop 16 attached to each of the inner three suspension lines 11A of the first group, and then secured to the most lateral suspension line of the first group. The strand 41B is coupled with the second group of suspension lines 11B in a similar manner. In addition, a connecting line 41C is connected between each corresponding pair of suspension lines included in the first group 11A and third group 13A, and between each corresponding pair of suspension lines included in the second group 11B and the fourth group 13B. By thus, from the front end of the frame 1, the first, second, fifth and sixth groups of suspension lines 11A, 11B, 13A and 13B can be first gathered and then pulled by the front pulling rope 41 into a withdrawn state under the pulling action of the reel 31 and through the guidance of the guide rollers 22 and 21.

The rear pulling rope 42 is fixed at one end to the reel 31, extends rearward through the guide roller 23, the movable pulley 25, the fixed pulley 24, and the guide pole 7, and then branches rightward and leftward into two strands 42A and 42B. The strand 42A is further guided through those loops 2A provided on the left side of the trailing edge of the canopy 2 and then fixed to the leftmost portion of the trailing edge. The strand 42B is coupled to the right said of the trailing edge of the canopy 2 in a similar manner. By doing so, the rear pulling rope 42 is connected to the trailing edge of the canopy 2 in a manner capable of gathering and pulling the canopy 2 into a withdrawn state from the rear end of the frame 1 under the pulling action of the reel 31 and through the guidance of the guide pole 7, the guide roller 23, the fixed pulley 24 and movable pulley 25. Since the total distance in the movement of the rear pulling rope 42 for bringing the canopy 2 from the rear end of the frame 1 into the withdrawn state as shown in FIG. 3 is much longer than, about three times as long as, the distance in the movement of the front pulling rope 41 for bringing the first row and third row of suspension lines from the front end of the frame 1 into the same withdrawn state, it is neceassary to provide the pair of fixed pulley 24 and movable pulley 25 before the reel 31 so that the rear pulling rope 42 may be wound around the reel 31, and thus the canopy 2 be withdrawn, at a much higher speed than the front pulling rope 41 is wound.

Figure 3:
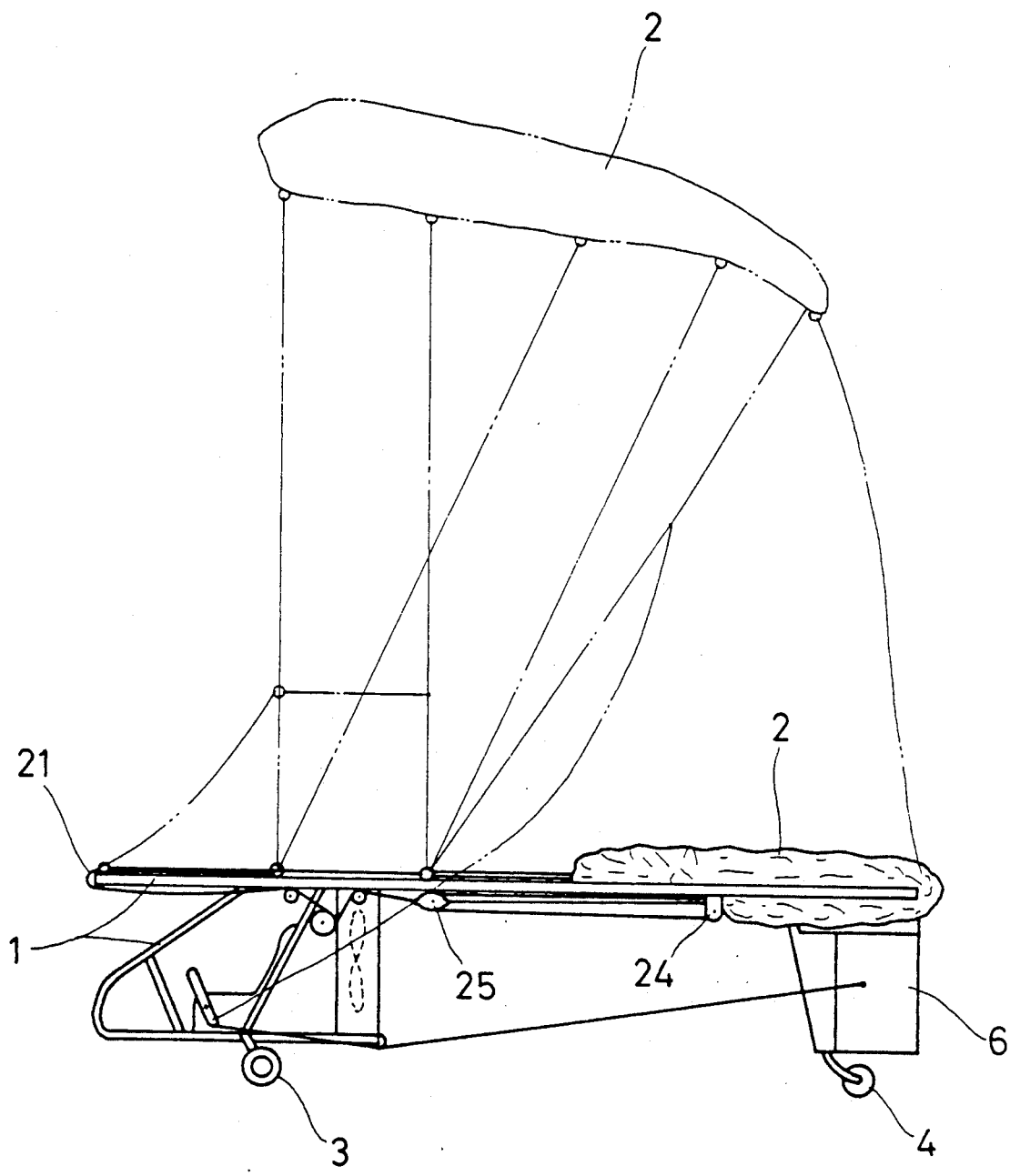
FIG. 3 is a side view of the parawing shown in FIG. 1, in which the canopy is illustrated in a withdrawn state by solid lines, and in an extended state by dotted lines.

According to the parawing having a construction as described above, with the canopy being withdrawn into the state as shown in FIG. 3, the parawing can be easily steered on the ground free from the possibility of being acted by strong side wind on its canopy. Besides, due to the provision of a rudder at the tail end of the frame, the moving direction of the parawing can be automatically corrected into a direction against the wind when the parawing is acted by a side wind upon take-off so as to avoid the possibility of being upset by the wind. In addition, the provision of the horizontal stabilizers on the frame makes it possible to avoid the pendulum-like motion of the cart and the pilot when the propeller is being accelerated or decelerated.

Figure 6:
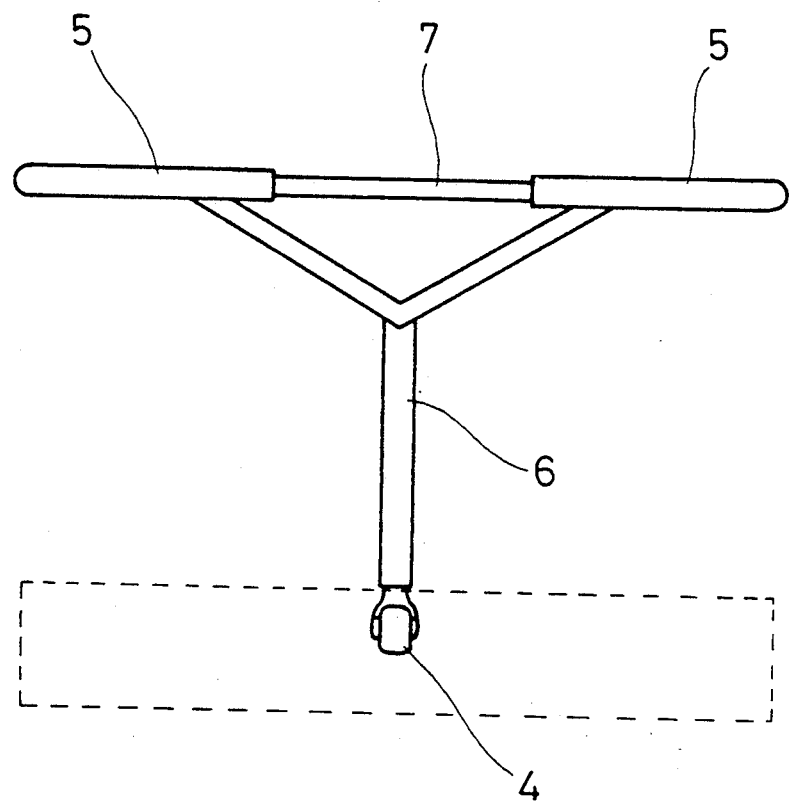
FIG. 6 is a back view showing only the horizontal stabilizer, rudder etc. of the parawing in accordance with the present invention.
Figure 7:
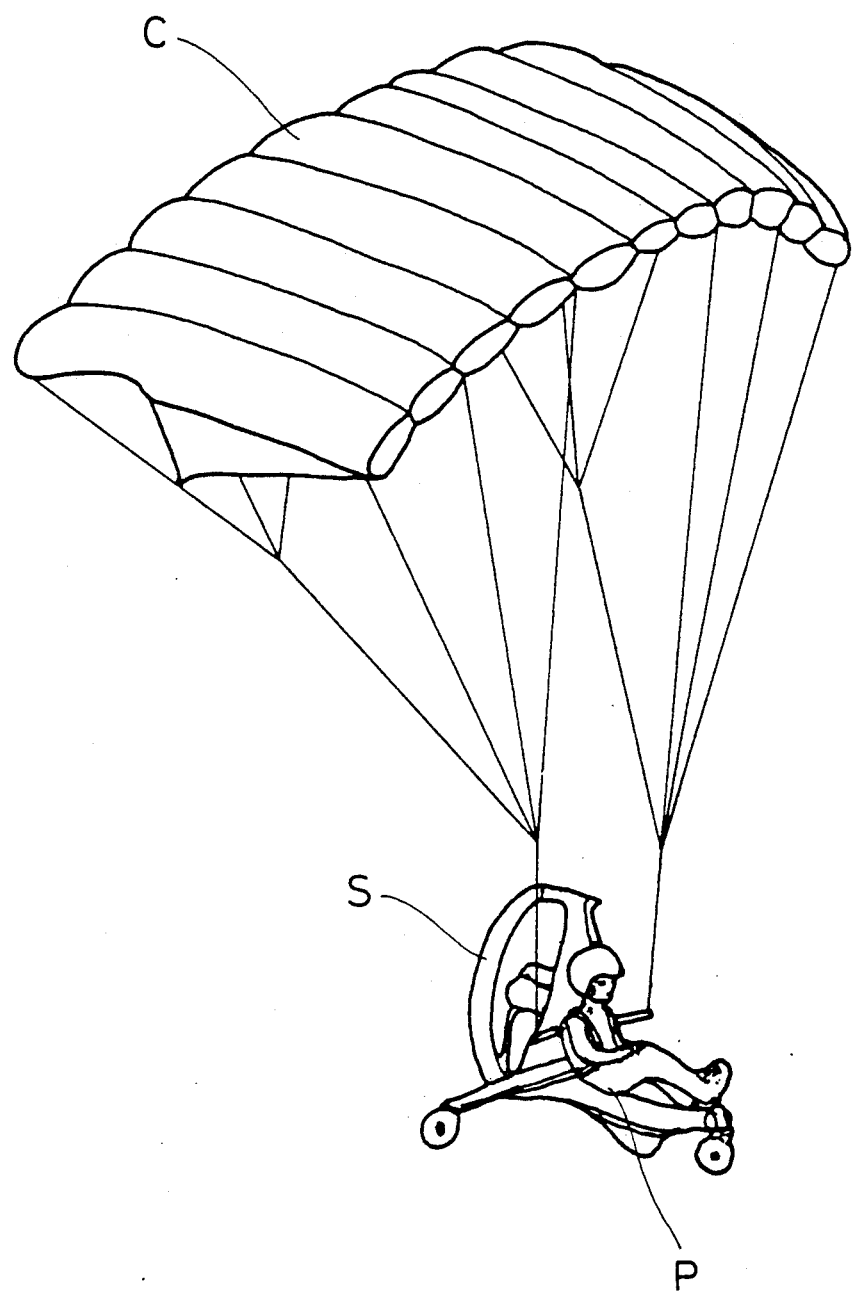
FIG. 7 is a schematic perspective view of a conventional paraplane.
Figure 8:
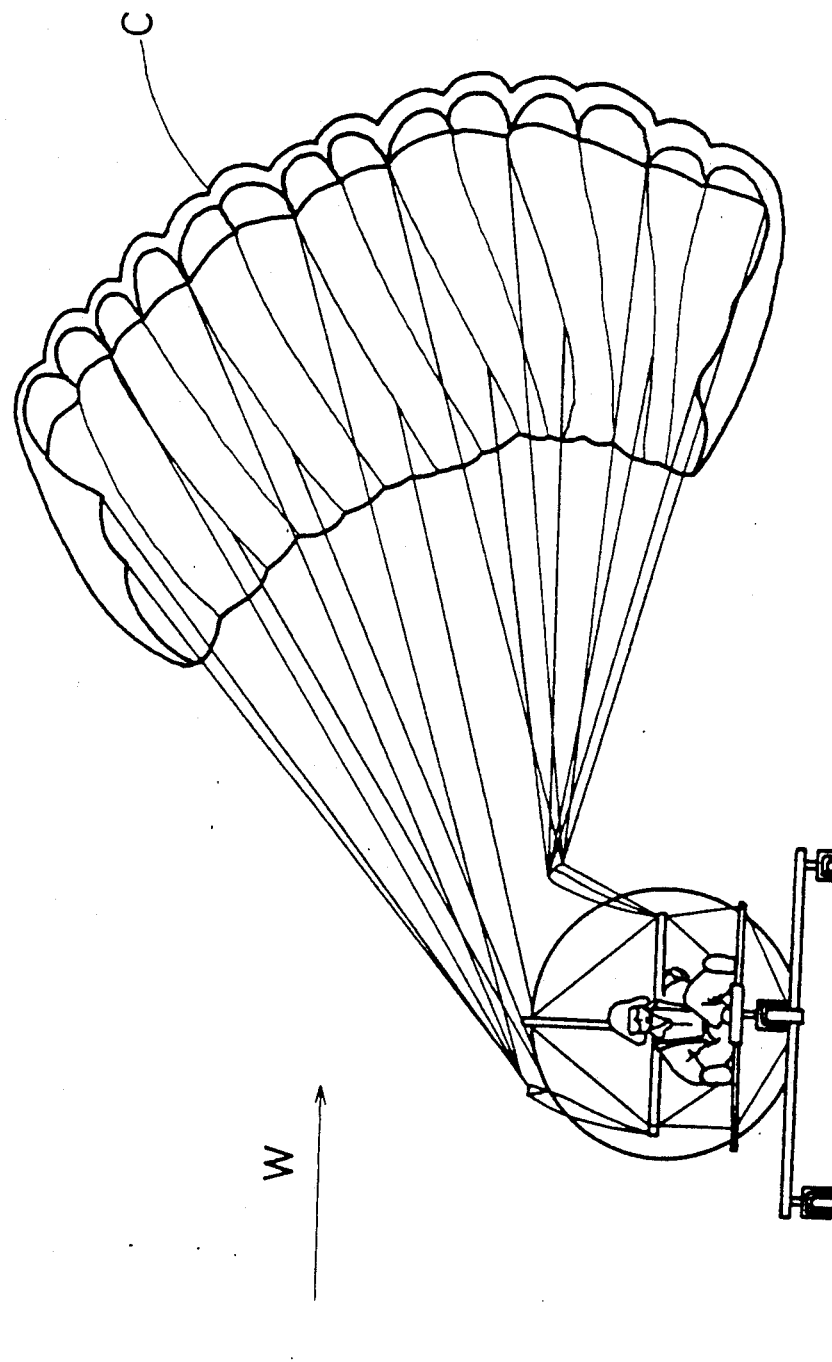
FIG. 8 is a front view of the same conventional paraplane, showing the state when the canopy of the paraplane is being acted by a strong side wind.
Figure 9:
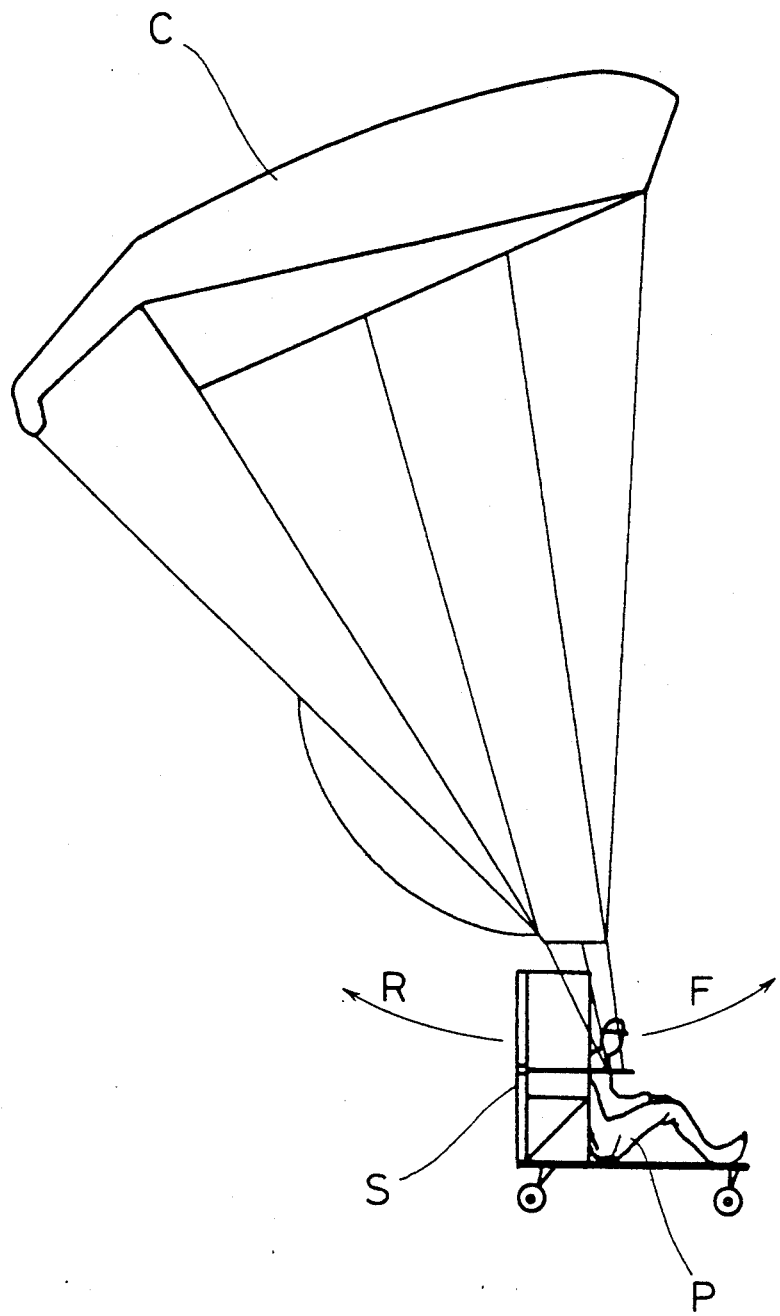
FIG. 9 is a side view of the same conventional paraplane.

As shown in phantom lines in FIG. 6, the wheels of the parawing can be replaced by at least two floats so that, with the canopy being automatically withdrawn in advance, the parawing can be safely landed on the water surface.

While the invention has been described in terms of what is presently considered to be the most practical and preferred embodiment, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A parawing with an automatic canopy withdrawing mechanism, comprising:
   a canopy adapted to produce a lift required for upwardly supporting said parawing, said canopy having a leading edge and a trailing edge;
   a frame having a front end and a rear end to which said canopy is fastened and on which a pilot can be carried, said frame including horizontal stabilizing means;
   a propeller mounted on said frame adapted to produce a thrust required for the propulsion of said parawing;
   a rudder pivoted to said rear end of said frame around a vertical axis;
   a first row of suspension lines each line having an upper and a lower end including a first group and a second group of suspension lines, said first group of suspension lines being separately fixed at their upper ends to the left side of the canopy near said leading edge, and being fixed at their lower ends to a first fastening point on said frame; said second group of suspension lines being separately fixed at their upper ends to the right side of the canopy near said leading edge, and being fixed at their lower ends to a second fastening point on said frame;
   a second row of suspension lines each line having an upper and a lower end including a third group and a fourth group of suspension lines, said third group of suspension lines being separately fixed at their upper ends to the left side of the canopy intermediate of said leading edge and said trailing edge, and being fixed at their lower ends to the first fastening point on said frame; said fourth group of suspension lines being separately fixed at their upper ends to the right side of the canopy intermediate of said leading edge and trailing edge, and being fixed at their lower ends to the second fastening point on said frame;

a third row of suspension lines each line having an upper and a lower end including a fifth group and a sixth group of suspension lines, said fifth group of suspension lines being separately fixed at their upper ends to the left side of the canopy intermediate of said first group and said third group of suspension lines, and being fixed at their lower ends to a third fastening point on said frame; said sixth group of suspension lines being separately fixed at their upper ends to the right side of the canopy intermediate of said second group and said fourth group of suspension lines, and being fixed at their lower ends to a fourth fastening point on said frame;

a fourth row of suspension lines each line having an upper and a lower end including a seventh group and a eighth group of suspension lines, said seventh group of suspension lines being separately fixed at their upper ends to the left side of the canopy intermediate of said third group of suspension lines and said trailing edge, and being fixed at their lower ends to said third fastening point on said frame; said eighth group of suspension lines being separately fixed at their upper ends to the right side of the canopy intermediate of said fourth group of suspension lines and said trailing edge, and being fixed at their lower ends to said fourth fastening point on said frame;

a row of steering lines each line having an upper and a lower end including a left group and a right group of steering lines, said left group of steering lines being separately fixed at their upper ends to the left side of said trailing edge of said canopy and being fixed at their lower ends to said third fastening point on said frame; said right group of steering lines being separately fixed at their upper ends to the right side of said trailing edge of said canopy, and being fixed at their lower ends to said fourth fastening point on said frame;

a front group of guide rollers provided at proper locations in said frame;

a rear group of guide rollers provided at proper locations in said frame;

an automatic canopy withdrawing mechanism mounted on said frame, including a reel which may be rotated to pull back said suspension lines for withdrawing said canopy;

a front pulling rope which is fixed at one end to said reel, which extends forward through said front group of guide rollers, and is then properly connected to all suspension lines included in said first, second, fifth and sixth group of suspension lines in a manner capable of gathering and pulling said first, second, fifth and sixth group of suspension lines into a withdrawn state from the front end of said frame under a pulling action of said reel and through the guidance of said front group of guide rollers;

a rear pulling rope which is fixed at one end to said reel, which extends rearward through said rear group of guide rollers, and is then connected to said trailing edge of said canopy in a manner capable of gathering and pulling said canopy into a withdrawn state from the rear end of said frame under a pulling action of said reel and through the guidance of said rear group of guide rollers.

2. A parawing with an automatic canopy withdrawing mechanism as claimed in claim 1, wherein said automatic canopy withdrawing mechanism further comprises a motor which may be operated by a pilot to drive said reel, a clutch and speed reducer assembly interconnecting said motor and reel, and a stopping means which may be operated by a pilot to optionally lock said reel from unintentional turning or to release said reel for free turning.

3. A parawing with an automatic canopy withdrawing mechanism as claimed in claim 1, further comprising a fixed pulley mounted on said frame and a movable pulley, through which pulleys said rear pulling rope also passes for accelerating the withdrawl of said canopy.

4. A parawing with an automatic canopy withdrawing mechanism as claimed in claim 2, further comprising a fixed pulley mounted on said frame and a movable pulley, through which pulleys said rear pulling rope is also guided for accelerating the withdrawl of said canopy.

5. A parawing with an automatic canopy withdrawing mechanism as claimed in claim 1, further comprising at least one float mounted below said frame so that said parawing may be landed on the water surface.

* * * * *